April 4, 1961 R. G. TARR 2,977,624
ROLLER APPLICATOR TRAY AND ATTACHMENT
Filed Sept. 2, 1958
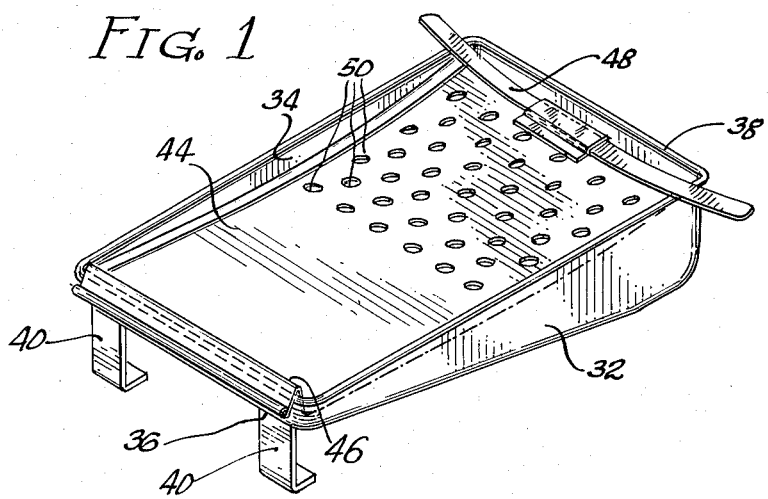
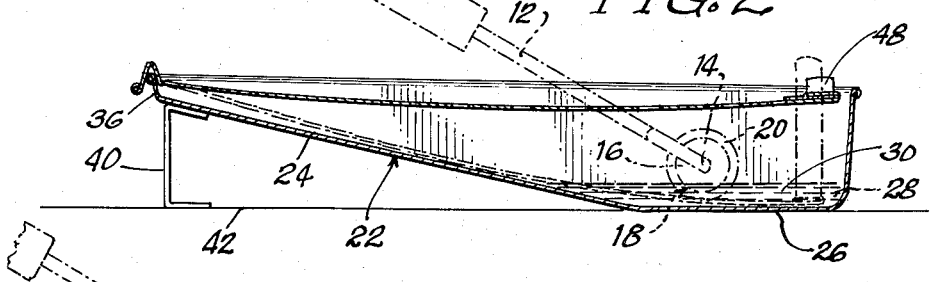
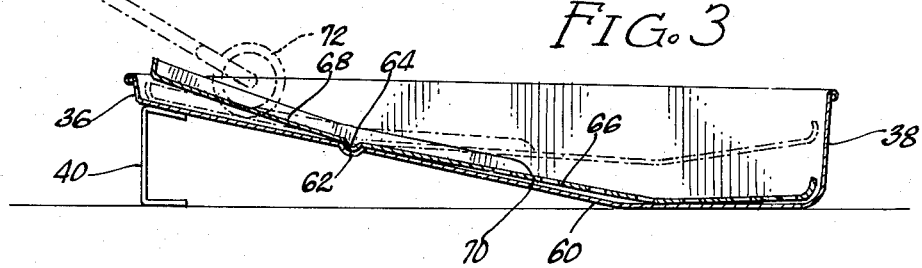
INVENTOR.
Robert G. Tarr
BY
Ooms, McDougall, Williams & Hersh
Attorneys

2,977,624
ROLLER APPLICATOR TRAY AND ATTACHMENT

Robert G. Tarr, 541 N. Humphrey Ave., Oak Park, Ill.

Filed Sept. 2, 1958, Ser. No. 758,209

1 Claim. (Cl. 15—257.06)

This invention relates to the application of coating compositions, such as paint, by roller coating process, and it relates more particularly to a pan assembly for use in combination with a roller coater and wherein the paint or coating composition is contained for replenishing and distributing the paint supply on the surfaces of the roller.

Roller applicators, or paint or other coating compositions, have achieved wide acceptance both professionally and amateur-wise in the application of paint upon surfaces. In the roller coating process, use is made of a relatively flat pan in which a supply of the coating composition or paint is introduced. The pan is dimensioned to have a width slightly greater than the width of the roller, and the bottom wall of the pan is formed with a forward end portion which is inclined downwardly to a relatively flat trough at the other end wherein most of the fluid composition collects. The roller is started down the inclined surface and is advanced into the bath of the paint composition substantially completely to wet the surface of the roller and then the roller is withdrawn up the inclined bottom wall of the pan to remove excess paint and to achieve more uniform distribution of the paint composition about the periphery surfaces of the roller. Generally, uniform distribution can be achieved by this means. However, as is characteristic of most paint compositions, the paint and filler tend to settle to the bottom. Such separation occurs relatively quickly in oil base paints. While it is possible periodically to mix a paint while in the paint can to achieve redistribution, such simple means are not available in the relatively shallow bath of paint composition spread across a relatively wide surface in the bottom of the pan. As a result, pigments and fillers tend to settle from the paint in the pan with the result that the composition and the viscosity of the composition is subject to continuous change. Thus, the coverage is subjected to continuous change thereby to militate against uniform application and appearance.

It is an object of this invention to provide a means whereby the pigment distribution and viscosity of the paint composition in the pan will remain substantially uniform from the time that the paint is introduced to the full utilization thereof whereby more uniform coverage can be achieved.

More specifically, it is an object of this invention to provide a means for agitating the paint or coating composition in the pan to minimize settling or a non-uniform distribution of the pigments and fillers, and it is a related object to provide a means for achieving the described results as an incidence to the normal use of the pan for replenishing the supply of the paint or coating composition on the roller.

These and other objects and advantages of this invention will hereinafter appear and for purposes of illustration, but not of limitation, embodiments of the invention are shown in the accompanying drawings.

Figure 1 is a perspective elevational view of a pan assembly embodying the features of this invention;

Figure 2 is a sectional elevational view taken lengthwise through a central portion of the pan in Figure 1 and showing the relative arrangement of parts when coating composition is applied to the roller coater; and Figure 3 is a sectional elevational view similar to that of Figure 2 showing a modification in the construction.

Referring now to the drawings for a description of the invention, the roller applicator is represented by a handle 10, and a stem 12 which extends rigidly from a central portion of the handle and which is provided with a crosswise extending shaft 14 on the end thereof adapted removably to receive the cylindrical hub 16 of the roller 18 having a removable covering 20 positioned on the peripheral surface thereof. The covering 20 is formed of the conventional fabric or bristle-type material for transferring the paint composition from the pan to the surface to be finished.

The pan employed in Figures 1 and 2 is of conventional construction having a bottom wall 22 formed with an elongate downwardly inclinde forward end portion 24, terminating in a relatively horizontally disposed flat portion 26 forming a trough 28 at the far end in which the paint or other coating composition 30 is adapted to be received. The pan is formed with side walls 32 and 34 extending upwardly from the lateral edges of the bottom wall and with a forward end wall 36 and a rearward end wall 38 extending upwardly from the forward and rearward edges respectively of the bottom wall. The downwardly inclined forward end portion of the bottom wall is provided with legs 40 which are adapted to rest upon the supporting surface 42 to hold the forward edge of the pan in spaced relation from the supporting surface while the trough portion 26 rests thereon.

The concepts of this invention are embodied in a flutter plate employed in combination with the pan and wherein the flutter plate comprises a flat sheet 44 of a resilient metallic or plastic material dimensioned to have a length corresponding to the length of the pan, and a width which is less than the width of the pan so as to enable the flutter plate to be received in fitting relationship within the pan. The plate is contoured to correspond with the bottom wall of the pan so as to lie substantially flush and in abutting relationship with the bottom wall of the pan when displaced to its lowered position of adjustment. The forward edge portion of the plate is provided with means for pivotally engaging the plate onto the front wall of the pan, as illustrated by the inverted V-shaped portion 46, dimensioned to have a depth corresponding to the height of the front wall so as to receive the front wall therein while the bottom side of the plate rests upon the bottom wall of the pan. The rear edge portion of the plate is provided with means adapted constantly to urge the corresponding edge portion in the direction away from the bottom wall of the pan. As illustrated in Figure 1 of the drawing, such means may comprise an elongate strip 48 of spring metal secured intermediate its edges to the rearward edge portion of the pan and dimensioned to have a length greater than the width of the pan so that the end portions of the spring member will extend beyond the side walls of the pan even when the plate is displaced to its lowered position of adjustment. It will be apparent that the resilient means may comprise separate members secured to the edge portions of the plate and instead of providing members extending laterally into engagement of the side walls of the pan, the resilient means may comprise spring members extending forwardly into engagement with the upper edge of the wall 38 of the pan or other equivalent resilient means may be employed constantly to urge the plate in the direction away from the bottom wall of the pan.

The plate is further provided with a plurality of foramens 50, preferably located in the portion of the plate corresponding to the trough although the remainder of the plate may also be provided with similar or equivalent openings.

In operation, the resilient means will tend to hold the plate in raised position as shown in Figure 1 to position almost the entire plate out of contact with the paint composition collected mainly in the trough portion of the pan. When it is desired to replenish the supply of coating composition upon the roller, the latter is placed on the inclined upper surface of the plate near the front edge. Pressure is applied to the roller as it is displaced downwardly over the plate whereby the resultant force will cause displacement of the plate into the pan to bring the plate substantially into abutting relationship with the bottom wall of the pan. As the plate is displaced downwardly, it is caused to shift through the bath of paint composition simultaneously to cause the paint to extrude through the foramens of the plate thereby to produce such agitation and turbulence substantially throughout the entire bath as to maintain complete and uniform distribution of the pigments and fillers therein.

When the roller has been coated by the paint composition and is displaced forwardly up the incline, the resilient means become effective to raise the plate from lowered position to raised position. This again introduces agitation as the plate raises through the liquid bath and as the paint composition drains through the openings into the pan. The raised plate also provides a flat surface full of foramens over which the roller can subsequently be stroked to achieve removal of excess paint and uniform distribution of the paint composition over the surfaces thereof.

In the modification illustrated in Figure 3, use is made of gravitational force in combination with the force of the roller to achieve the desired movements of the flutter plate. In this instance, spring members are not employed constantly to urge the plate to a predetermined raised position.

Instead, the pan 60, having a shape of the type previously described, is provided with an embossed portion 62 extending crosswise in the inclined portion thereof at a point closer to the front wall than the back wall. The flutter plate dimensioned to correspond with the dimension and shape of the pan bottom is also provided with a corresponding embossment 64 of curvilinear shape adapted to be received in the embossed portion 62 of the pan wall. The flutter plate 66 is further modified by being bent at a slightly upward angle across the embossed portion, so that when the embossed portion of the plate is seated in pivotal engagement with the embossed portion of the pan, the upper end portion 68 of the plate beyond the pivot will be spaced upwardly from the bottom fall of the pan when the portion 70 below the pivot is at rest on the bottom wall. Conversely, the portion below the pivot will be raised from the bottom wall when the portion 68 above the pivot is at rest on the bottom wall. Thus, the flutter plate operates as a support which rocks about its pivot.

In operation, when the pan is loaded with paint composition which collects mainly in the trough at the bottom and preferably below the pivot 62, the greater length of the pan below the pivot will cause the plate normally to seek a position wherein the bottom end portion of the plate is at rest on the bottom wall of the pan below the pivot. However, when a roller 72 is placed in the upper portion of the plate above the pivot, the plate will be rocked about its pivot to bring the lower end portion out of the bath, as illustrated in Figure 3. As the roller is advanced downwardly along the inclined surface of the plate to a point beyond the pivot, the plate will be forcibly rocked about its pivot to normal position rapidly to displace the foraminous portion of the plate through the bath to provide the previously described agitation and mixing action. Thus mixing will occur while the plate is rocked in both directions in use, thereby to provide for agitation more uniformly to distribute the pigments and fillers as a coincidence to use.

In emulsion-type water paints, the agitation can be used further to enhance the emulsification as well as the distribution of materials. For this purpose, the foramens in the plate may be made of various dimensions, shape or distribution, but it is desirable to provide for sufficient openings of sufficient dimension to permit ready passage of the liquid through the plate during the displacement of the plate through the back.

The foramens may be shaped to provide maximum agitation as by the use of oddly shaped openings or by the use of a screen-type member as the lower mixing portion of the plate. It will be apparent that the plate can be formed without a pivot connection to the front wall of the pan, but it is desirable to fabricate the plate of a length to be received in substantially fitting relationship likewise within the pan so as to achieve the desired movements. It will be apparent further that the plate can be removed from the pan for purposes of cleaning or replacement or repair, and that the plate can be used interchangeable with one or more pans. The agitation developed by the plate will enable the plate to be used also in cleaning both the pan and the plate with cleaning solutions thereby to facilitate the cleaning both of the pan and the plate.

It will be further understood that changes may be made in the details of construction, arrangement and operation without departing from the spirit of the invention especially as defined in the following claim.

I claim:

A roller coater tray assembly comprising a pan having a bottom wall and side and end walls extending upwardly from the side and end edges of the bottom wall and wherein the bottom wall is formed with a trough portion at one end and a downwardly inclined portion leading into the trough from the other end and a flutter plate comprising a relatively flat sheet of relatively rigid material dimensioned to have a width less than the spaced relation between the side walls, a length corresponding to the length of the bottom wall and a shape corresponding to the shape of the bottom wall when in lowered as well as when in raised position, said flutter plate being formed with a plurality of foramens at least in the end portion corresponding to the trough portion of the bottom wall, and means mounting the flutter plate in the pan for rocking movement between raised position and lowered position with the foraminous trough-shaped portion of the plate spaced upwardly from the bottom wall of the pan when in raised position and in abutting relation with the trough portion of the bottom wall of the pan when in lowered position and means constantly urging the plate towards raised position and comprising a spring finger rigid with the plate in the trough end portion and extending beyond the edges thereof into engagement with the adjacent upper edge of a pan wall.

References Cited in the file of this patent

UNITED STATES PATENTS

| | | |
|---|---|---|
| 860,838 | Spingler | July 23, 1907 |
| 2,659,096 | Mencfeldowski | Nov. 17, 1953 |
| 2,671,239 | Wisner | Mar. 9, 1954 |
| 2,779,960 | Ogren | Feb. 5, 1957 |

FOREIGN PATENTS

| | | |
|---|---|---|
| 533,467 | Belgium | Dec. 15, 1954 |